United States Patent [19]

Bixel, Jr.

[11] Patent Number: 5,105,898
[45] Date of Patent: Apr. 21, 1992

[54] HOVERCRAFT GROUND-EFFECT VEHICLE

[76] Inventor: Charles G. Bixel, Jr., 923 Skipper Ave., Ft. Walton Beach, Fla. 32548

[21] Appl. No.: 413,591

[22] Filed: Sep. 28, 1989

[51] Int. Cl.$^5$ .............................................. B60V 1/11
[52] U.S. Cl. .................................... 180/117; 180/126
[58] Field of Search ........................ 180/116, 117, 126

[56]     References Cited
       U.S. PATENT DOCUMENTS

| 3,244,246 | 4/1966 | Weiland | 180/116 X |
| 3,742,888 | 7/1973 | Crowley | 180/126 X |
| 4,151,893 | 5/1979 | Mantle  | 180/116   |

Primary Examiner—Charles A. Marmor
Assistant Examiner—Alan M. Kagen
Attorney, Agent, or Firm—John P. Halvonik

[57] ABSTRACT

A flying hovercraft and ground effect vehicle design. The flat double-wing design for small, medium, and large cargo or military transport vehicles allows travel from very slow to medium to high speeds over water or land. The highly elongated, flat wing of very low aspect ratio provides a vehicle that is capable of traveling in ground effect flight at a safe distance above the water. Primarily a high-speed (150-200 kts), over-water, ground-effect, vehicle that is augmented with hovercraft capabilities for acceleration to flight speed, deceleration, and slow to moderate speed (0-75 kts.) operations. The vehicle design is adaptable from one-man units to large, ocean-going high-speed cargo ships of 400 feet and over, with carrying capacities over five million pounds. A vehicle of this design is 250% more efficient than modern aircraft, 15 times faster than cargo ships, and capable of going into true flight to overfly land masses for ocean-to-ocean and inland lake or river access. The design can be adapted to a multitude of fast, military, over-water vehicles of any size capable of travel over any terrain.

10 Claims, 4 Drawing Sheets

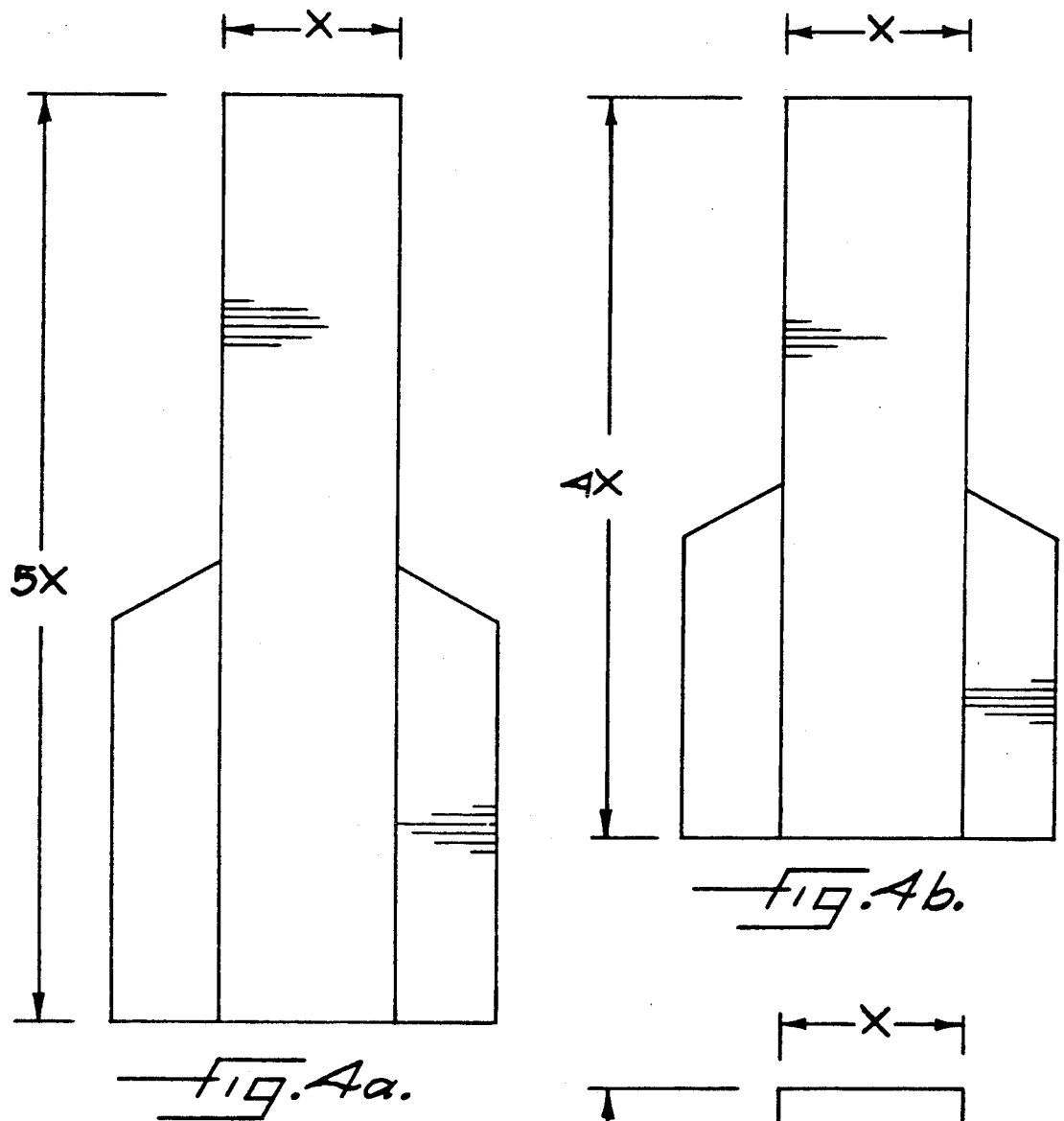
fig.4a.
fig.4b.
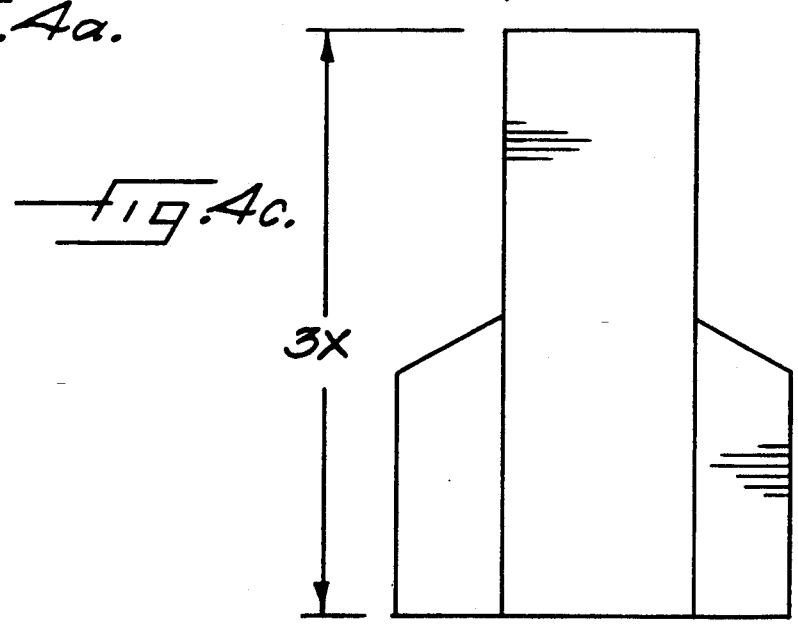
fig.4c.

HOVERCRAFT GROUND-EFFECT VEHICLE

BACKGROUND OF THE INVENTION

The invention relates to fluid cushion ground effect vehicles and, specifically, to vehicles which derive their lift by dynamic action of an airfoil operating in close proximity to a surface plane. When conventional airfoils are operated in a region close to the ground plane, their normal pressure distribution is changed. Air is trapped, and pressure develops to a high level under the wing and adds this pressure to the lift of the airfoil. This added pressure of the trapped air on the bottom side of the wing is known as ground effect.

Ground Effect (GE) is encountered only when an airfoil aircraft is flying in close proximity to a flat ground plane. No one knows exactly what the altitude is, where you run out of GE and go into true flight, nor what effects varying wingspans have. The GE envelope is generally considered to be one quarter of the wing span or one and one third the wing chord for standard air craft designs. The ground effect principle increases the lifting capability of the wing up to 250% and promises an economical, fast, transport vehicle requiring minimum or no prepared special operating surfaces when operated as a large seaplane.

Ground Effect, unlike true flight, traps air between the airfoil/wing/vehicle and the ground/water surface and, thus, enhances the airfoil coefficient of Lift by 250 to 350 percent without increasing the aerodynamic drag factors. An airfoil flying in the GE envelope is much more efficient than an airfoil in true flight. An aircraft can operate in GE at one-quarter ($\frac{1}{4}$) the horsepower or one-quarter ($\frac{1}{4}$) the fuel consumption required for true flight. A trans-ocean cargo aircraft of comparable size and weight will burn four (4) times the fuel of a flying in GE aircraft.

High lift chambered airfoils (typical cargo aircraft) cannot safely remain in GE when the airspeed is sufficient to generate the lift required to fly. Flat/symmetrical airfoils only generate about two-thirds ($\frac{2}{3}$) the lift of a chambered airfoil; therefore, higher speeds can be attained in GE with the flat wing. In other words, the flat wing plane can remain at faster speeds for a longer time before encountering lifting forces that would force it into true flight. Flat/symmetrical airfoils have almost no Center of Lift travel like a chambered airfoil and have no pitch-up tendencies when entering and departing the GE envelope. An aircraft can fly in GE at about one-half ($\frac{1}{2}$) its minimum flight speed.

There have been several designs for the vehicles developed and tested since 1935. The tested vehicles have served to accumulate data on performance and have generally indicated:

1. It requires one-quarter to one-third the horsepower to fly in ground effect as it does in true flight.
2. That ground effect flight altitudes generally extend from ground level to about 25% of the aircraft wing span or 1.33 times the wing chord.
3. The vehicles are exceptionally smooth and stable on ground effect flight.
4. That low aspect ratio chamber wings (AR of slightly less and slightly larger than 1.0) tend to pitch up in transition from ground effect to true flight.
5. Have difficulty in maintaining ground effect flight when true flight speeds are reached.
6. Report poor turning capability while in ground effect flight, in that the vehicles must bank like an aircraft and may stick a wing in the water.
7. Large cargo versions of the aircraft type structures and plan-forms would be extremely expensive to build, have small cargo capacity for their size, and would not fit well into existing port and harbor facilities (long, thin docks).
8. The large and complex aircraft aluminum type structures and plan-forms would be short-lived operating in a sea environment due to corrosion, plus operating and maintenance costs would be excessive on these complex aluminum structures.
9. Industry proposals for ocean-going Wing In Ground Effect vehicles have not been for large vehicles, nor have they proposed anything except modified aircraft plan-forms and aircraft type construction.
10. Ocean-going Wing In Ground Effect vehicles must be large enough that their most economical cruising altitude clear all average sea-wave conditions. They must be large, long, and fast enough for the air cushion to average or cancel ocean wave and swell conditions. They must be able to land and take off in average sea conditions.
11. That large ocean-going vehicle structures should be sufficient to provide an adequate economical life span. Adequate flotation should be provided to prevent sinking in a down-at-sea condition with partial break-up.

SUMMARY OF INVENTION

The invention relates to a dynamically stable flying Hovercraft vehicle capable of operating from very slow to high speeds primarily over water. The design combines the capabilities of a Hovercraft and an aircraft optimized to travel in the economical ground effect flight mode. The design can be used on small, one-man vehicles, medium-sized vehicles similar to large, modern airliners, and to vehicles as large as ocean-going cargo ships. The flat wing with low aspect ratio allows flying in the ground effect mode at a height four times greater than at which conventional planes can fly in the ground effect mode.

It is the objective of the present invention to provide a significantly large commercial or military aircraft capable of safe hovercraft or ground effect operation at high speeds over open sea conditions.

Another objective is to provide a large flying Hovercraft vehicle capable of transporting large loads which can land and take off in average sea conditions.

Still another objective is to provide an aircraft vehicle capable of operating in the ground effect mode at higher altitudes than conventional aircraft.

Another objective of the present invention is to provide a flying Hovercraft/Ground Effect vehicle design that is safely adaptable to any size vehicle, large or small.

Additional objectives are as follows:
1. To provide a Hovercraft ground effect aircraft vehicle having good maneuverability and natural stability throughout its speed range.
2. To provide a flying Hovercraft vehicle that can land, take off, hover, and navigate over water or land.
3. To provide a flying Hovercraft vehicle with such natural aerodynamic and hydrodynamic stability that high-speed water/wave impacts, which may cause pitch-up and/or yaw, are safely damped.

4. To provide a flying vehicle which will stay in ground effect flight while operating at high, true flight airspeeds.

5. To provide a flying Hovercraft vehicle which can rapidly and smoothly go into true flight at high speeds to avoid emergencies or to overfly small and large land masses.

6. To provide a large flying Hovercraft vehicle of greatly increased cargo volume and weight that is physically compatible with existing port docking, loading, and unloading facilities.

7. To provide a flying Hovercraft vehicle that is structured in such a way as to allow greatly simplified construction techniques as compared to modern aircraft structures.

8. To provide a highly agile, zero draft, fast or slow, marine cargo vehicle capable of beaching, docking, or even climbing out of the water on hardened ramps for cargo loading and/or off-loading operation.

BRIEF DESCRIPTION OF THE DRAWINGS

Other objectives and many of the advantages of the invention will be readily apparent as its simplicity becomes better understood by references to the following appended claims when considered in conjunction with the accompanying drawings wherein:

FIGS. 4a, 4b and 4c are drawings of the wing plan-form geometric design proportions. The three drawings show the geometric variations possible to change the aspect ratio of the wing without changing the basic proportions, which satisfy the combination Hovercraft/aerodynamic wing plan-form design.

DESCRIPTION OF THE INVENTION

Figure 1:
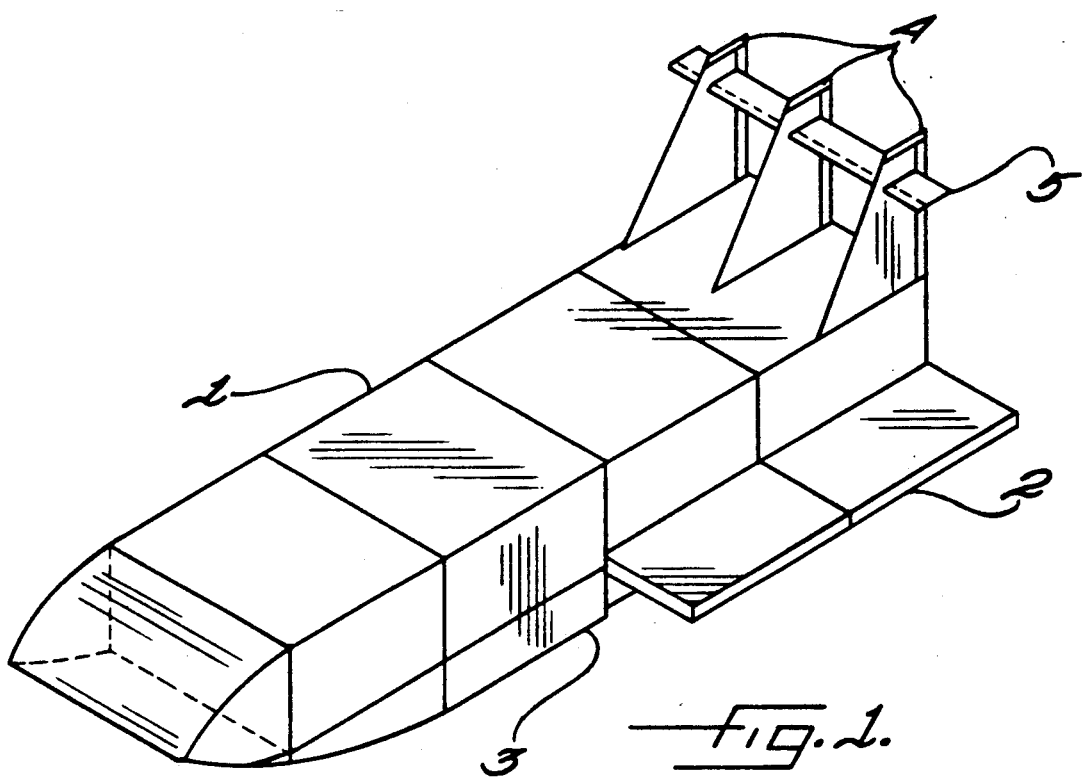
FIG. 1 is a pictorial, three-quarters top view of the basic vehicle design.

The basic design may be optimized from a long-narrow wing plan-form (very low aspect ratio) to a short and wide vehicle to satisfy operational requirements or to increase load capacity. The wing plan-form design variation as described in FIG. 4 has little effect on the overall natural dynamic stability of the vehicle, as long as the CG remains properly positioned. The weight-lifting capability of the design is directly related to the wing area; and as the vehicle is mostly wing, it has maximum lift. A 300 foot long vehicle with a 100-foot wide cargo body will have a wing area of approximately 45,000 square feet. Compared with the large and modern aircraft (C-5) with 6,000 square feet wing area, the lifting capacity for the 300-foot vehicle can be well over two million pounds, or seven times the weight and 56 times the volume of the C-5 aircraft.

The Hovercraft capability of the design provides a zero draft (0-100 mph) vehicle capable of beaching and negotiating ramps completely out of the water. Medium-sized vehicles of 200 feet in length could operate from large airdromes. The landing gear for this vehicle would be a very lightweight structure as compared to conventional aircraft, in that the gear will be used only for steering to leave the runway and taxi to the parking area. The Hovercraft function supports the vehicle weight throughout the landing, takeoff, and taxiing.

The full-length, stepped, Hovercraft air containment walls/pontoons mounted to the bottom of the body allow the vehicle body and wings to be lifted out of the water for Hovercraft cruising or acceleration to ground effect flight speed. The air containment walls are designed to be structural with flat bottoms. The flat bottoms of the structural air walls give a water ski effect for emergency stopping and landing on water, give bounce-off rather than dig-in from inadvertent surface contact during high speed ground effect or Hovercraft operation. The stepped, air walls/pontoon's design allows the vehicle to accelerate in the Hovercraft mode with zero degrees (0 degree) angle-of-attack for the wing to takeoff speed, then rotate to the proper takeoff angle.

A large 300-foot length vehicle would have 25 feet deep and 20 feet wide Hovercraft air containment walls/pontoons. The 25-foot deep air walls allow these large vehicles to operate and takeoff in the open seas with the bottom of the wing/body 25 feet above the average wave system. The deep air walls and short wings allow banking of the vehicle for turning in ground effect flight. Wing and nose water/wave contact during banking turns on this long, narrow vehicle design are not adverse as reported on long-wing or short-coupled ground effect test vehicles. Nose wave contact (bounce-off) does not result in a critical pitch-up, primarily due to the long moment arm of the vehicle and the damping action of the elongated ground effect air pad. The short wings placed on the aft end of the vehicle and behind the center of gravity allow a built-in dynamic recovery from inadvertent wing tip water contact in banked turns. See FIG. 1&2.

The simplicity of the structure for this design, as compared to modern day aircraft structures, is unusual in modern day vehicles, where each generation is more complex and costly. The vehicle has no tapered skins, tapered wings spar, high stress joints, or pressurized, round, streamlined structures. The design allows simple, flat structures of moderate strength as the vehicle is supported over its entirety when at rest in the water or in flight. The cargo floor strength and engine installations are the major high strength areas. The advancements in composite structures allow the building of large, lightweight, unsinkable, corrosion-proof vehicles at greatly reduced cost compared to modern aircraft manufacturing techniques. The composite structure of structural foams, kevlar/aramid cloths, and epoxy resins can produce a vehicle of this design with few internal bulkheads for a clean, uncluttered interior storage space. The design is not for high performance vehicles but rather for a moderate speed, low altitude, operational envelope with increased safety factors directed at operating in a watersea environment. Compared with conventional cargo aircraft of equal length, this design has five to eight (5-8) times the cargo area, four to nine (4-9) times the wing area, and about one-half ($\frac{1}{2}$) the wing span.

Chambered airfoils are aerodynamically unstable and require horizontal tailplane or canard control surfaces to compensate for this pitch instability. The flat, elongated Bixel double wing is aerodynamically stable. The center of lift travel for a flat wing is very small and reversed to that of a chambered wing. See FIG. 6. The reversed center of lift travel stabilizes the flat wing in pitch and automatically compensates for airspeed changes with corresponding pitch changes. The flat wing, when operated at high speeds, becomes what has been called a hyper wing. The flat wing at high speeds aerodynamically achieves a nearly zero degree angle-of-attack, minimum drag, and a highly stable flight condition. This condition exists only when the protuberances above and below the wing offer identical drag. However, only very small flight control forces are required to return the wing to positive or negative angle-of-attack. Worthy of note is that flat wing efficiency and stability are the same upright or inverted.

GENERAL DESIGN FEATURES

Figure 2:
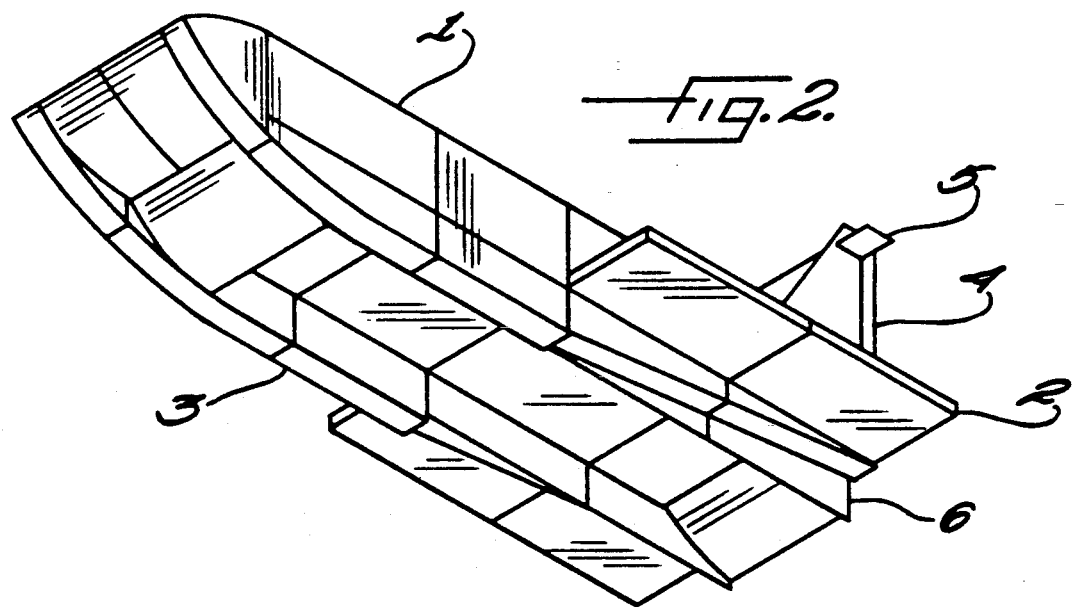
FIG. 2 is a pictorial three-quarters bottom view of the vehicle basic design proportion.
Figure 3A:
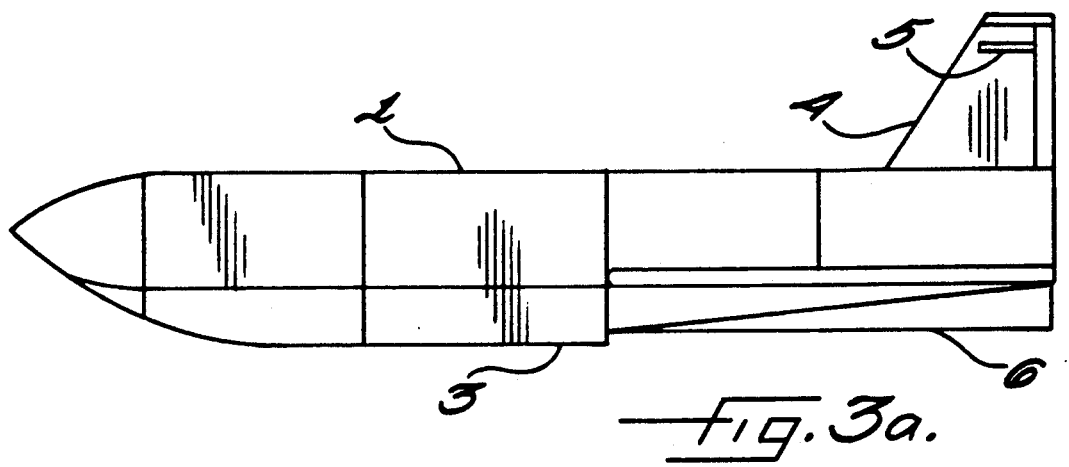
FIGS. 3a, 3b and 3c are a plan-form side, top/bottom, and rear view, respectively, of the vehicle basic design.
Figure 3B:
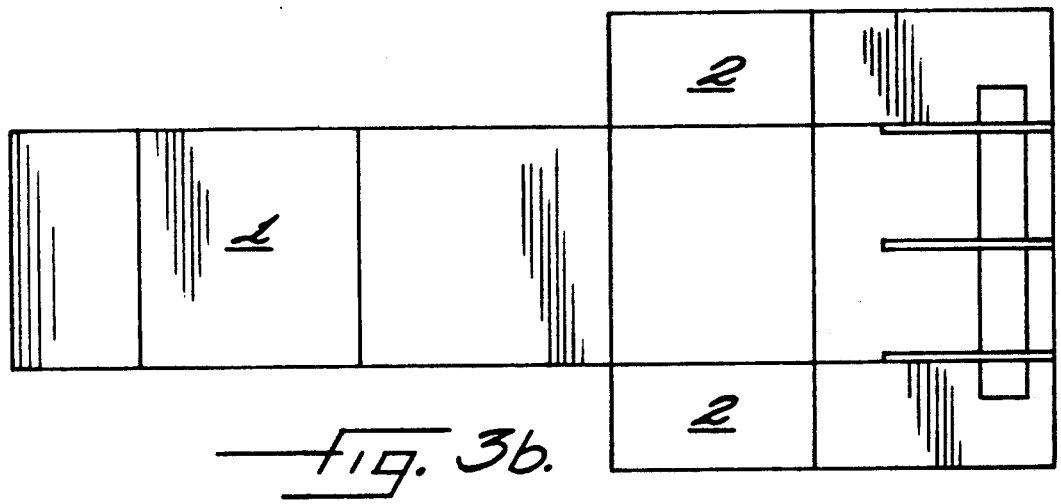
Figure 3C:
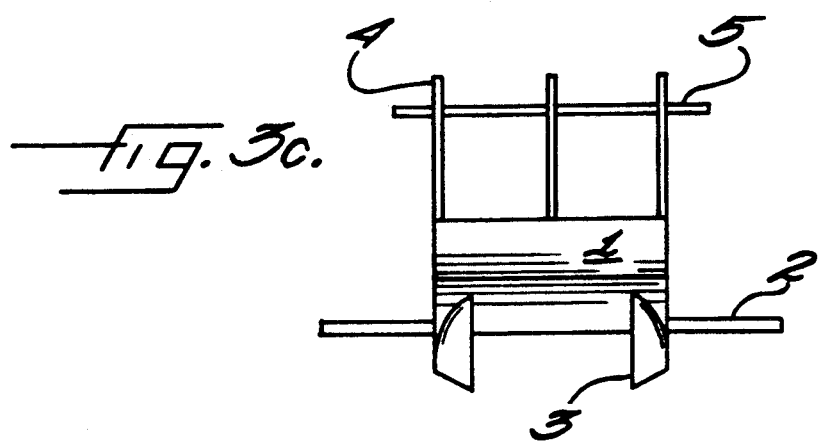

Referring to the drawings, wherein like reference numerals designate like or corresponding parts throughout the several views, the basic vehicle design, according to this invention, is substantially as shown in FIGS. 1 and 2, which are pictorial views.

Flat Wing. The main body of the vehicle is a very low aspect ratio flat wing geometrically designed to combine two vehicles:

1) An elongated Hovercraft (HC) center section body (1) (cargo hold) balanced at its geometric center, and 2) two each elongated very low aspect ratio flat wing attachments (2) incorporating the Hovercraft pad area and reforming the entire vehicle wing surface area to place the center of gravity (CG) between the 25% to 33% Mean Aerodynamic Chord (MAC) of the total vehicle wing plan-form.

FIG. 4 indicates how this geometric wing design may be varied in length and width to satisfy various vehicle operational requirements without changing the basic geometric proportion of the vehicle or its operational capabilities.

The optimum Aspect Ratio (AR) for this design appears to be from 0.25 to 0.5 for the center cargo body wing and the same AR for the secondary/double wings for GE and true flight. Numerous flight test models were constructed, all having the same wing area and weight, but with varied Aspect Ratios to determine the best wing platform for flight stability and lift characteristics in GE and true flight. The variations of the AR described described in FIG. 4 should remain between the 0.25 and 0.5 range. Increasing the AR from 0.25 to 0.5 and holding the length of the chord (and body length) constant increases the wing area, which increases the lifting capability.

This very low aspect ratio design provides a vehicle which is all wing for lift and flotation. The elongated design traps and contains the ground effect cushion for a much longer time than the higher AR chambered wing designs, thus providing a more efficient air cushion. The very large wing chord (up to 10 times that of conventional aircraft) also allows the ground effect envelope to be 4 times the operational depth of these aircraft. The larger the vehicle of this design, the more efficient it will be, due to the viscosity of air and its inability to easily escape from beneath the larger vehicle rapidly. The faster the vehicle, the more efficient it will become for the same reason. The use of a flat wing rather than a chambered airfoil wing provides several advantages:

1) A flat wing does not provide the aerodynamic lift of a chambered airfoil wing; therefore, the flat wing will remain in ground effect at higher speeds than a chambered wing; i.e., when a ground effect vehicle reaches true flight speeds, it will lift out of ground effect and go into true flight. The use of retractable wing top spoilers on this design degrades the lift generated by the top of the wing/body and allows it to continue in ground effect flight, while traveling well into the true flight speed envelope at speeds usually reserved for true flight. The closing of the spoilers at high ground effect flight speeds provides a positive transition to true flight and a rapid climb away. Moving the center of gravity forward decreases the wing angle of attack to almost zero for high speed flight, riding up the top of the ground effect envelope.

2) The second reason for using the flat wing design is manufacturing costs. Chambered airfoil wings are expensive to build. Simple, flat box structure costs much less to manufacture.

3) The very low AR wing with a wing chord ten times larger than conventional cargo aircraft, provides a much safer operating environment. For example, a C-130 cargo aircraft is 100 feet long with a 120 feet wing span (GE=one-quarter ($\frac{1}{4}$) the wing span or 30 feet). The C-130 fuselage is about 25 feet deep, so flying in the upper limits of the GE envelope the belly is only five feet out of the water, much too close to the water because it's absolutely impossible to maintain altitude within five feet in any large aircraft. The flat, double wing design with a 100-foot long hull/wing chord will have a 133 foot deep GE envelope (1.33 times the wing chord). The double wing on the bottom of the vehicle allows flight altitudes above the water of 25 feet to 75 feet, while still remaining in the lower portion of the GE envelope. The 300 foot long vehicle (FIG. 5) would have an operational GE envelope of 400 feet.

Model testing indicates that the chambered airfoil aircraft do not ride on the top of the envelope but, operate at the very bottom of the envelope clearing the water by a small margin. Actual vehicle prototypes tested in Russia, China, and Germany, only flew a foot or two above the surface plane (chambered airfoil, Lippisch). The Bixel wing models consistently glide/slide on the upper boundaries of the envelope (1.33 times the wing chord) for extended distances, aerodynamically compensating for speed changes by themselves.

Air containment Walls. Two each full-length, hover craft, air containment walls/pontoons (3) are placed on the bottom of the body on each side of the Hovercraft pad area. These walls serve several functions other than Hovercraft air pad containment: 1) They provide a water ski effect for rapid deceleration of the vehicle without the HC in operation, and 2) the aircraft type pontoon/hull design with a pair of Air Fences (6) allows the vehicle to accelerate and operate in the Hovercraft mode from slow to high speeds in a flat minimum drag attitude. 3) The walls also act as aerodynamic fences for increased performance when the vehicle is in ground effect and true flight. 4) The walls/pontoons have been made wide for several reasons; one has been mentioned previously, for a water ski effect, and the second for structural integrity. Thin air retaining walls have been subject to damage and deterioration on previous Hovercraft test vehicles. Designing the walls/pontoons to be thick and structural provides longitudinal strength to the vehicle, better absorbs wave impacts at high speeds, provides added flotation and water stability, gives a flat riding surface during acceleration and deceleration, provides fuel storage cells away from the cargo and engine sections. The HC air containment walls/pontoons on a 400-foot long vehicle may be 25 feet deep and 20 feet wide at the nose of the vehicle. This depth of the walls/pontoons allow a large vehicle of this design to land and take off in an open sea with the hull and the wings 25 feet above the water.

Air Containment Doors: Retractable Hovercraft pad air containment doors are mounted fore and aft between the pontoons. These doors are hinged at the top to allow retraction when the Hovercraft function is not in use and the vehicle is in ground effect flight. Retraction of the rear Hovercraft air containment door at high speeds allows the vehicle to rotate to a positive angle-of-attack for lift-off. The doors are sloped aft at a sufficient angle to allow their bottom edge to slide over the water surface with minimum drag resistance. The forward door is held down and in place by the HC air pressure; when the HC is turned off/shutdown for ground effect flight, the front door is forced up flush with the flat bottom of the wing by ram air. The rear air containment door is similar in design and function to the forward door but must be mechanically held down during HC operations. In ground effect flight, the rear door is retracted or forced up by ram air.

Hovercraft Engine: In addition to the thrust engines the vehicle has a hovercraft engine capable of forcing air into the area between the air containment walls. This engine is cutoff when the vehicle goes from hovercraft of ground effect flight. This allows the front door to be forced open by the force of the ram air. The rear containment door is already open, this is done under the pilot's direct control. The vehicle will accelerate rapidly and go into the ground effect mode of operation.

Operating speed for this design has been limited to 200 knots top speed and 150 knots cruise for several reasons.

(a) Operating at 300-400 knots in GE is impossible as the vehicle will climb up out of the envelope and go into true flight.

(b) Structural—An aircraft structured to travel at 300-400 knots must weigh eight to ten times that of an aircraft designed to travel at 200 knots. The added weight of the structure and high performance flight engineering will greatly increase the vehicle production cost, plus increase the take-off speed required.

Air Fences. The thin air fences (6) attached to the inside of the containment walls and running from the stepped portion of the containment walls to the rear of the pontoon provide a straight line bottom for the pontoon/containment walls. The thin air fence extends on a straight line with the bottom of the forward pontoon and acts as an air wall for the HC function. The fences allow the vehicle to operate a zero degree angle of attack when in the hovercraft mode. The completely walled, mechanically generated air pad allows the design to operate as a zero draft HC type vehicle for water operations. The aft HC air containment door is retracted at take-off speeds and allows the stepped pontoon design to come into effect, allowing the vehicle to rotate to a nose high position, increasing the angle-of-attack for take-off from the water into GE flight. The thin air fences also provide a rudder effect for the vehicle when it is in the take off mode. They are immersed in the water, provide directional stability, and prevent side sliding.

Wave Bounce-Off & Dig-In—The pontoons of the present invention have been designed to reduce the effects of bounce off and dig in. Bounceoff occurs at high speeds on the water from wave contact. The catamaran-type pontoons slice through the wave tops and allow the wave to flow beneath the vehicle hull; and when airborne, the long (longitudinal) GE air pad stabilizes/compensates for nose wave impact caused pitch-ups, by increased air pad pressure at the rear of the hull, aerodynamically returning it to stable/level GE flight conditions. Dig-in occurs when you plow into a big wave at moderate to high speeds. The thin catamaran pontoons slice/plow into the wave until the flat underbody and the upsloped nose contact the water. The large surface area of the hull underbody and the upswept nose stop the dig in at this point, and the vehicle regains its Hovercraft operation automatically (test results).

Wing Wave Contact Dynamic Recovery—Wing contact in GE flight is highly unlikely on this very short wing design. Standard design seaplanes with long wings can stick a wing tip or wing tip pontoon in the water at high speeds on the water or in flight while banking, and will shear the wing or cartwheel into the water—end of machine! The large area short wings placed well aft of the Center of Gravity for this design actually resists being forced into the water by increased under wing air pressure (GE) generated by the proximity of the water. GE pressures increase inversely to the distance from the ground plane. The banking aircraft in GE is forced back to level flight. Wing tip wave contact may be forced by excessive control forces.

Wing tip wave contact for this design occurs at the trailing edge of the wing and far behind the vehicle Center of Gravity. Wing tip water contact will also be at a positive angle-of-attack that produces bounce-off rather than dig-in of the wing tip. The water contact will cause a slewing of the vehicle around the wetted wing tip. The Center of Gravity of the vehicle placed so far forward of the water contact point dynamically counteracts the slewing action, plus the wing tip bounce-off rather than dig in rights the vehicle before the pilot can react to the situation (test results).

Wing Top Spoilers—When any aircraft reaches an airspeed and angle-of-attack that the airfoil generates sufficient lift to carry the dead weight of the aircraft, the vehicle will exit the GE envelope and go into true flight. Decreasing the angle-of-attack decreases the lift generated and allows the vehicle to stay in the GE envelope at a higher speed. Spoilers/fences mounted to the top of the airfoil also reduce the lift generated by the top of the airfoil, while not affecting the lift generated on the bottom side of the wing produced by GE, thus, allowing the vehicle to travel faster without leaving GE flight.

Fold-up Wings—The folding wings transform the design to a rectangular barge shape for water operation, allowing it to tie up to docks and piers. The Hovercraft and Folding Wing features of this design provide a highly agile, zero draft, fast or slow, marine cargo vehicle capable of beaching, docking, or even climbing out of the water on hardened ramps for cargo load/off-load operation. Typical seaplane designs with long wings/engines/propellers cannot tie up to docks/piers to be loaded or off-loaded at existing port facilities but must be anchored in mid-harbor and be loaded/off-loaded by lighters (small barges). Large seaplane type aircraft will also have the same draft as comparable size ships and cannot move in shallow water or approach shorelines for off-loading.

Seaplanes are very clumsy vehicles when down in the water and are greatly affected by even light winds when attempting to maneuver. Seaplanes can only be operated at slow speeds on the water, due to this clumsiness. Seaplanes are very fragile vehicles (aircraft-type structure), and the slightest contact with any object can cause major damage.

Maneuvering Controls—The flight control designs are conventional aircraft type and constitute the mounting of two or three (2 or 3) large vertical stabilizers 4 with conventional aircraft rudders at the rear of the body for high speed ground effect and true flight turn control. Pitch and roll control is provided by a large horizontal flying tail 5 (entire tail moves) mounted between the tops of the vertical stabilizers/ rudders. These controls act as elevons (elevators /ailerons) for roll and pitch control. The short wings on this design have improved turning capability in ground effect flight over the long wing designs. Slow to moderate speed Hovercraft mobility is enhanced by retractable water rudders and swivel mounted reverse thrust engines. Operations on land or airfields will use the Hovercraft lift, plus small, lightweight wheels for steering and braking. The maneuvering controls for a combined Hovercraft, ground effect, and a true flight vehicle present problems. High speed ground effect vehicles do not have the agility of other surface vehicles. These vehicles are slow to decelerate and do not turn fast. The ability to go into true flight to jump/fly over obstacles in their path is a major asset. Flight controls are of little use in the ground effect mode as the vehicle is completely stable. The use of retractable wing top spoilers and/or retractable under wing tip fences for turning provides a safe minimum radius turn without the danger of wing or nose dig-in.

EMBODIMENTS

The design can be for any size therefore specific data on wing spans, wing chords, and wing areas will be different for each vehicle. I have used the C-130 Lockheed (Hercules) cargo aircraft as a basic comparison. The basic comparison is that the C-130 fuselage (hull) is 100 feet long. My figures are based on a 100 foot long cargo body (hull) for my design.

| C-130 Cargo Aircraft (100 ft. hull) | | | |
|---|---|---|---|
| Wing Span | | 120 feet | |
| Wing Chord | | 11.8 feet | |
| Aspect Ratio | | 9.5 | |
| Wing Area | | 1420 sq. feet | |
| Main Cargo Bay Volume | | 3400 cu. feet | |
| Bixel Double Wing Cargo Design (100 ft. hull length) | | | |
| Aspect Ratio | 0.25 | 0.33 | 0.50 |
| Wing Span | 50 feet | 66 feet | 100 feet |
| Wing Area (sq. ft.) | 3750 | 4950 | 7500 |
| Cargo Bay Vol. (cu. ft) | 20,000 | 27,000 | 40,500 |

The ground effect envelope is generally considered to be one quarter of the aircraft's wing span or one and one third the wing chord.

A C-130 aircraft with a 120 ft. wing span will have a 30 ft. deep ground effect envelope.

The double wing design with the a 100 ft. wing chord will have a 133 ft. deep envelope, four times that of conventional aircraft designs.

Figure 5A:
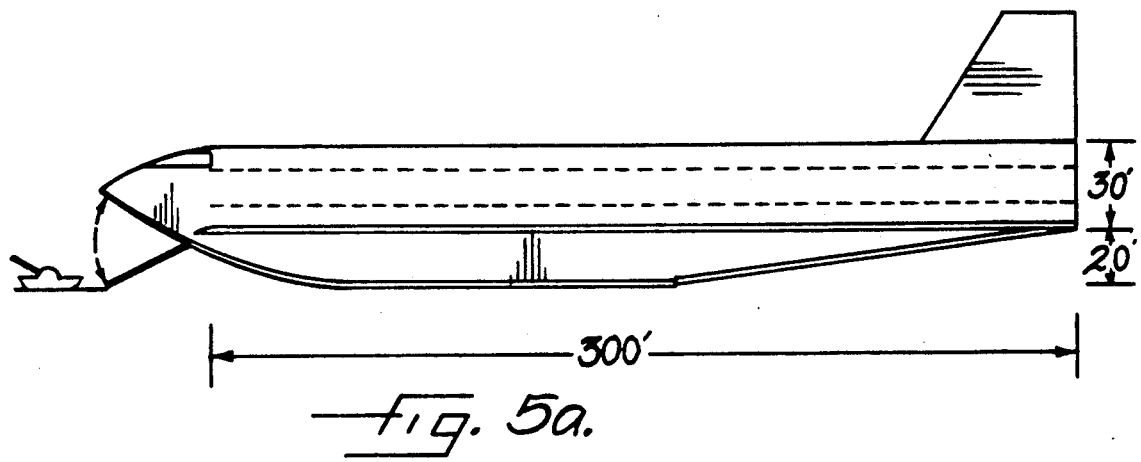
FIGS. 5a, 5b and 5c are pictorial views of general features for a marine attack vehicle. The dashed arrows in the front view indicate the aft wing fold-up position.
Figure 5B:
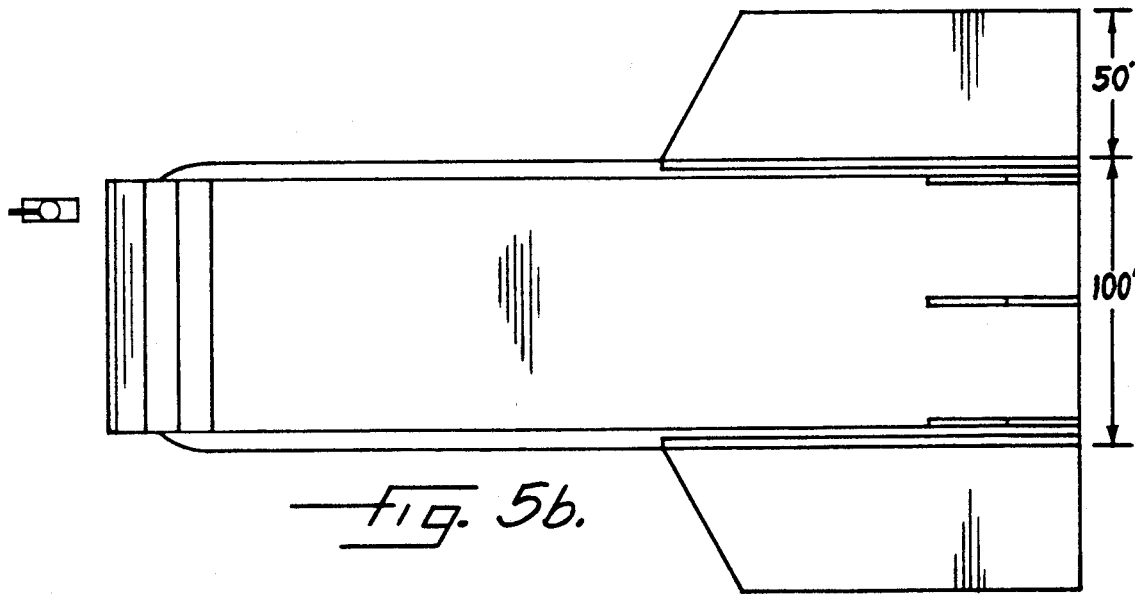
Figure 5C:
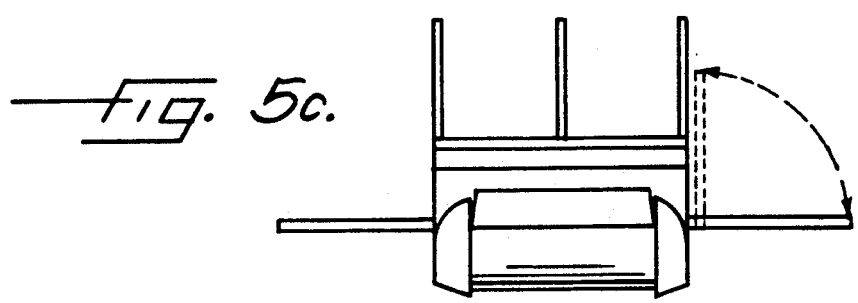

As a military transport: FIG. 5 illustrates a very large cargo vehicle of this design (300 feet long, 100 feet wide, and 33 feet deep cargo bay). This one vehicle could replace several squadrons of C-5 cargo aircraft and transport military tanks/trucks, hardware, and personnel almost anywhere in the world, without the requirement for large airfields. Commercial cargos normally carried by slow ships; i.e., automobiles, electronics, perishable food/products would have their shipping time reduced by a factor of ten (10). The largest modern cargo aircraft can only carry four to six (4-6) military tanks or trucks. To fly the Atlantic Ocean, the fuel weight required is nearly the weight of the aircraft. To double the size of these aircraft is not practical, because to double the size makes the vehicle weight go up eight (8) times, while only increasing the wing area by a factor of four (4). Doubling the aircraft size will produce an aircraft too heavy to fly. Present large cargo aircraft require the largest and strongest runways available to operate. These high strength runways are few and could be easily eliminated in war time. The cost of these large cargo aircraft does not justify their existence, except as military vehicles.

Note: The meaning of "Ground Effect" as opposed to "Hovercraft". A Hovercraft is a vehicle which mechanically generates a contained air cushion or bubble beneath itself to reduce the wetted area of the hull, thereby reducing the water drag and also producing a nearly zero draft marine vehicle. Aeronautical engineers note GE as that increased lift generate when operating in close proximity to a surface plane.

I claim:

1. An improved air flight vehicle for operation over bodies of water and land and capable of being in hovercraft or ground effect modes of operation comprising:
   a) a cargo hull having bow and stern and a wing system attached to said hull, said wing system being a flat-wing, double-wing system with said flat wings having an aspect ratio of about 0.25 to 0.50,
   b) where the center of gravity of the vehicle is at about the center of the cargo hull and the center of lift of the vehicle is at about the center of the cargo hull;
   c) where the wing span of said vehicle is about 0.5-1.0 times that of the hull length;
   d) said vehicle having air-cushion generation means capable of generating a cushion of air underneath said cargo hull;
   e) said vehicle having ground effect movement means capable of propelling said vehicle in ground effect flight.

2. The vehicle of claim 1 where in said vehicle has structural air containment walls mounted on the bottom of said cargo hull, said air containment walls parallel to said vehicle's length, said air containment walls capable of trapping air underneath said cargo hull when said vehicle is in the hovercraft mode of operation; said air cushion generation means being a hovercraft engine capable of forcing air between said containment walls; said vessel having air containment doors mounted between said walls and located fore and aft, wherein said doors are connected to said cargo hull and said doors are capable of retracting.

3. The vehicle of claim 2 wherein said air containment doors are sloped aft at an angle sufficient to allow said doors to slide over the water surface with minimum resistance to the water and said air containment walls have flat bottoms.

4. The vehicle of claim 3 where said double wing system comprises main body wings with an aspect ratio of about 0.25 to 0.5 and smaller wings mounted full at and aligned with the undersurface of said main body wing, said smaller wings having an aspect ratio of about 0.25 to 0.5, said smaller wings comprising about one-third of the total wing surface area of the craft so that the center of lift for the double wing profile is at about the center of the main body wing where it coincides with the hovercraft center of pressure.

5. The vehicle of claim 3 where in that portion of the containment walls that are slightly aft of the Center of Gravity are notched upwards; and the rear of said containment walls are tapered upwards so that said bow of said vehicle can rotate to an upward position when changing from hovercraft to ground effect flight.

6. The vehicle of claim 5 wherein the center of gravity of the vehicle is placed between about 25% to about 33% of the means aerodynamic chord arc.

7. The vehicle of claim 6 wherein relatively thin, air-fences are attached to said air containment walls near said notched portion of said containment walls, said air-fences being attached to the inside of said containment walls and running parallel to said containment walls, said air fences extending to the stern of said vehicle and capable of trapping air underneath said vehicle when said vehicle is in the hovercraft mode of operation.

8. The vehicle of claim 6 wherein said vehicle has air flow spoilers mounted on the top of said vehicle and capable of decreasing the amount of lift produced by the top of said flat wings during ground effect flight.

9. The vehicle of claim 6 wherein said vehicle has a main body wing span of about 50 to 100 feet, a wing area of approximately 3750 to 7500 square feet, and a cargo volume of about 20,000 to 41,000 cubic feet.

10. A method of going from hovercraft to ground effect mode in a vehicle capable of hovercraft and ground effect flight over bodies of water and said vehicle having front and aft air containment doors comprising the steps of:
allowing said vehicle to accelerate to a speed sufficient for ground effect flight;
retracting said aft containment door;
allowing said vehicle to rotate to a nose high position;
allowing said front door to retract;
allowing said vehicle to aerodynamically lift from the water surface and begin ground effect flight.

* * * * *